Nov. 12, 1968 R. F. COBAUGH 3,411,043

WIRE RETAINER FOR PANELBOARD

Filed March 3, 1966

United States Patent Office 3,411,043
Patented Nov. 12, 1968

3,411,043
WIRE RETAINER FOR PANELBOARD
Robert Franklin Cobaugh, Hershey, Pa., assignor to AMP Incorporated, Harrisburg, Pa.
Filed Mar. 3, 1966, Ser. No. 531,617
3 Claims. (Cl. 317—122)

ABSTRACT OF THE DISCLOSURE

Wire retainer for panelboard having terminal posts thereon comprises column having a laterally extending arm at its upper end and a plate-like base. Terminal post extends through opening in plate-like base. Arms of two adjacent retainers extend axially towards each other to form coacting pair of arms which bridge interval between the associated posts. Wires are retained between arms and surface of panelboard.

*Background of the invention*

This invention relates to a device for retaining the conductors on a wired panelboard consisting of a multiplicity of terminal posts which are interconnected by wires.

Many modern electrical and electronic devices require wiring panels or panelboards for making interconnections between printed circuit cards, integrated circuit devices, individual circuit components, etc. Such panels ordinarily have a multiplicity of termnal posts extendng from one side thereof and have means on the other side for mounting the circuit device. The mounting mean, for example, may take the form of an edge connector adapted to receive a printed circuit card. The panelboards thus serve as a mounting for the edge connectors on the one side and the posts on the other side are used to make electrical interconnections between the circuit boards. The posts may be wired by clip-type or wrap-type connections or the wires can be soldered or welded to the posts. The posts are usually spaced fairly close together and a large number of wires are usually required to make the necessary interconnections. Unless the wires are carefully laid and positioned against the panelboard, a disorderly and inefficient tangle will often result. Furthermore, many wires, by virtue of their mode of manufacture, have an inherent tendency to curl or loop intermediate their ends when their ends are connected to terminal posts. This tendency of the wires causes portions of the conductors to extend outwardly from the printed circuit board adding to disorganization of the conductors on the board.

The present invention is thus addressed to the problem of providing means for holding or retaining the wires on a panelboard in a neat and orderly fashion such that the individual wires can easily be traced by the technician and the wires will be retained between the ends of the posts and the surface of the panelboard thereby avoiding possible damage to the wires during handling.

An object of the invention is to provide an improved retainer for a wiring panelboard. A further object is to provide a retaining means which can be used on a board while the board is being wired by an automatic wiring machine or with a hand tool. A further object is to provide a wire retainer for a panelboard which will positively retain the wires in a neat and orderly fashion but which will permit removal of individual wires when and if necessary.

These and other objects of the invention are achieved in a preferred embodiment of a hold down or retaining device comprising a relatively small column of a length substantially equal to, or commensurate with, the length of the terminal posts of the panelboard. The column has a plate-like foot portion at one end thereof having an opening therein adapted to receive a terminal post so that the hold down device can be slipped over the post and against the surface of the panelboard with the column extending parallel to and beside the post. A laterally extending retaining arm is integral with, and extends from, the other end or free end of the column. This arm extends parallel to, and above, the surface of the panelboard. The entire hold down device is of insulating material and the arm is relatively flexible so that it can be deflected to permit passage of the wire and will return to its original position. In use, the necessary number of hold down devices are mounted on selected posts of the panelboard so that the arms will extend across the spaces or corridors between the posts. When the board is wired, the intermediate portions of the wires are located in these corridors and the wires are restrained from movement above the arms when they move against the undersides of the arms.

Figures 1, 2, 3:
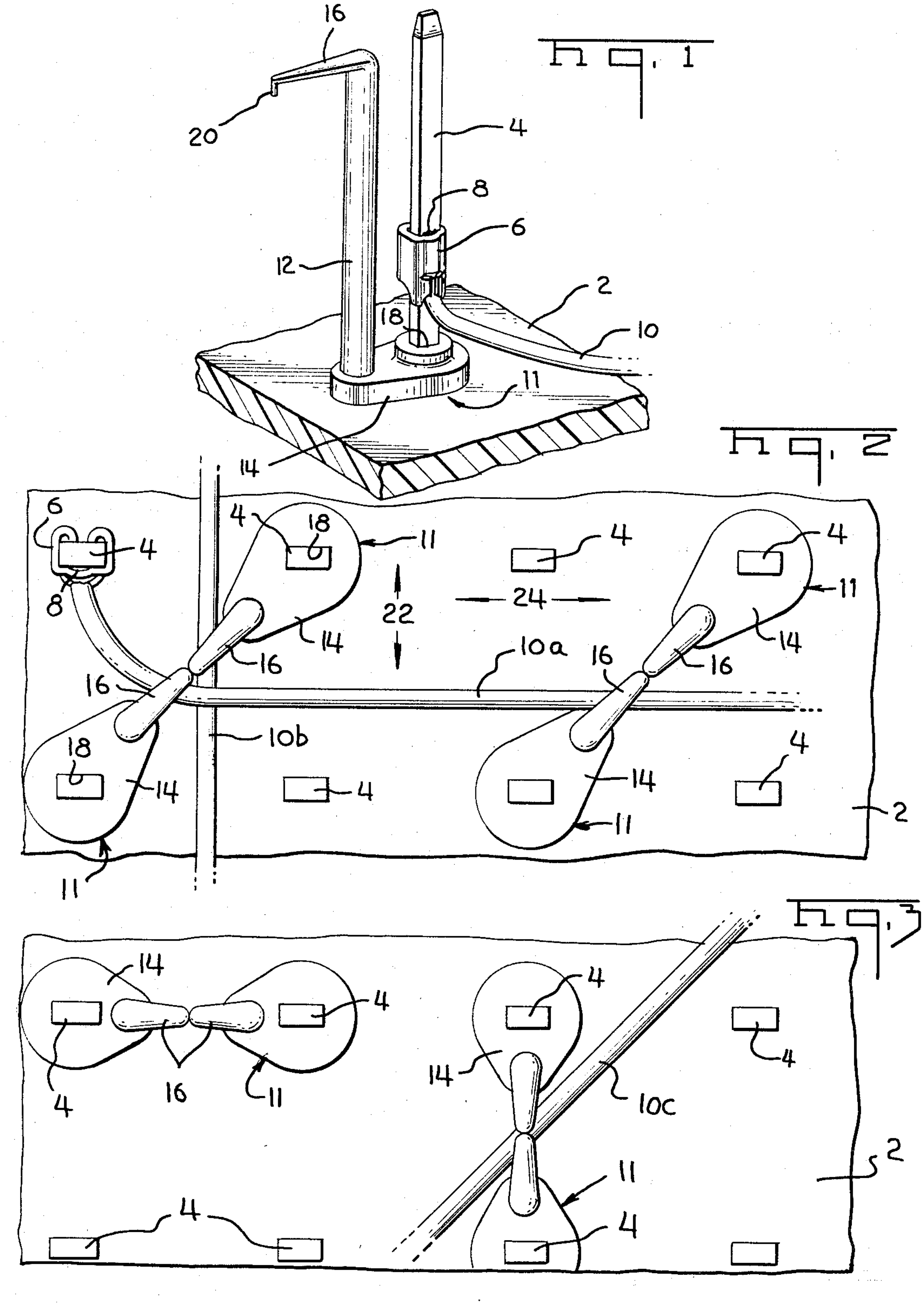
FIGURE 1 is a fragmentary perspective view showing an individual terminal post on the panelboard and an associated wire retaining device in accordance with the invention.
FIGURE 2 is a fragmentary plan view of a portion of a partially wired panelboard having retaining devices thereon in accordance with the invention.
FIGURE 3 is a view similar to FIGURE 2 but showing an alternative method of mounting retaining devices on a panelboard.

A conventional panelboard 2 will have a large number of terminal posts 4 mounted on, and extending from one of its sides, these posts usually being arranged in accordance with an X–Y coordinate grid system. The underside of the panelboard will conventionally have some means for mounting printed circuit cards, integrated circuit devices, or individual circuit components. The posts 4 thus extend through the board and are in electrical contact with the circuit device or the like on the opposite side of the board. Individual wires 10 extend between selected posts to effect the electrical interconnections between the components or circuit devices on the other side of the board. In the embodiment shown, these wires are assumed to be connected to the posts by clip-type terminations comprising terminal clips 6 which hold the stripped ends 8 of the wires against, and in electrical contact with, the posts. It should be mentioned that quite frequently several wires will be connected to an individual post by means of several clip-type terminations, one on top of the other. It should also be mentioned that the interconnecting wiring involves large numbers of conductors or wires and only a few such conductors are shown in the drawing in the interest of clarity.

The wires are ordinarily positioned on the panelboard with their axes extending in the X and Y directions as shown at 10*a* and 10*b* or with their axes extending diagonally as shown at 10*c*. The length of the individual lead wires is usually slightly greater than the distance between the posts which are electrically connected by lead wires in order to leave a short service loop or excess of wire in each lead. This excess can be used if it is necessary to remove any of the clip-type connections and later re-connect them to the same, or a different, post. The wires are preferably not drawn taut for the additional reason that the intermediate portions of the wires would be pulled against the edges of some of the terminal posts and have their insulation pierced by the posts. It can thus be perceived that when a large number of wires are used on a panelboard, there is a tendancy for the service loops in the individual wires to curl away from the face of the panelboard and to form an untidy looking and inefficient tangle.

A retaining device 11 in accordance with the invention comprises an intermediate column 12 having an integral plate-like foot portion 14 at one end thereof and having a laterally extending arm 16 at its other end. The entire retainer is preferably molded of a suitable insulation material such as nylon with the thicknesses of the three sections being such that the requirements for stiffness or flexibility will be achieved where needed as will be explained below.

The foot portion 14 is generally egg-shaped with the column extending from the apex or narrow end and has an opening 18 adjacent to the column for reception of a terminal post 4. The opening may be circular or may have a cross-section conforming to the cross-section of the post as shown. In any event, it is desirable that the arrangement be such that the foot portion of the retainer will be non-rotatably held on the post.

The retaining arm 16 extends laterally from the upper end of the column 12 and is tapered towards its ends so that it can be flexed. The tip or end portion 20 of the arm 16 extends downwardly to prevent the escape of wires which bear against the underside of the arm and which may have a slight resilient tendency to slide towards the end of the arm. The column portion 12 has a relatively heavier cross-section than the arm 16 and is relatively stiff and resistant to flexure as compared to the arm.

Retainers in accordance with the invention can be used in a variety of ways, FIGURES 2 and 3 showing conventional mounting methods for such retainers. In FIGURE 2, the retainers 11 are mounted in a manner such that the arms 16 extend diagonally with respect to the X and Y axes of the panelboard. In this figure, the retainers are used in pairs, each pair being disposed on adjacent diagonally offset posts with the arms extending diagonally across an X corridor and a Y corridor as indicated at 22 and 24. The arms 16 in this instance abut each other and the wires 10*a*, 10*b* can be located below the arms by merely forcing them downwardly to cause the flexible ends to yield and snap back into position.

In FIGURE 3, the individual retainers are, again, used in pairs but are oriented relative to the posts in a manner such that their arms extend across either the X corridors or the Y corridors. The mounting arrangement shown in FIGURE 3 has the advantage of permitting wiring with diagonally extending wires as indicated at 10*c*. These wires can also be positioned beneath the arms or pairs of cooperating posts by merely flexing the arms downwardly during application.

The wiring of panelboards may be carried out manually with a suitable hand tool (a clip-applying tool or wire-wrapping tool) or may be carried out with an automatic wiring machine which attaches one end of a lead to a post and then automatically lays wire against the panelboard along a path extending to a second post and attaches the other end of the wire to the second post. Where manual wire techniques are being employed, the operator can locate the wires beneath the arms by merely pushing them downwardly against the board. Where an automatic wiring machine is used, the arms will be flexed downwardly by the wires then they are fed towards the board and laid along the board. In either event, after the wires have been laid against the board, the arms will return to their normal positions and prevent the upward movement of the wires under the influence of their inherent curling tendencies.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. A wiring panelboard having terminal posts extending therefrom, said posts being arranged in accordance with a coordinate X–Y grid system, a plurality of wire retainers on said panelboard, said wire retainers being of insulating material and each retainer comprising a column portion extending normally of the plane of said panelboard, a retaining arm extending laterally from the upper end of said column portion, and a plate-like base on the lower end of said column, said base having an opening therein and one of said terminal posts extending through said opening, said retaining arms being disposed in a plane extending parallel to the plane of said panelboard, the arm of each retainer extending axially towards the arm of an adjacent retainer to form a coacting pair of arms, each pair of arms bridging the interval between the posts associated with said pair of arms, said arms being deflectible laterally of their axes whereby, during wiring of said panelboard, said wires can be positioned beneath said arms and will be retained between the plane of said panelboard and said one plane.

2. A panelboard as set forth in claim 1 wherein said arms extend diagonally with respect to the cardinal directions of said X–Y grid system.

3. A panelboard as set forth in claim 1 wherein said arms have a depending tip portion directed towards the surface of said panelboard.

References Cited

UNITED STATES PATENTS

| | | | |
|---|---|---|---|
| 2,182,847 | 12/1939 | Johnson | 317—122 |
| 3,087,984 | 4/1963 | Waranch | 174—135 |

FOREIGN PATENTS 1,094,324 12/1960 Germany.

DARRELL L. CLAY, *Primary Examiner.*